G. W. B. EDWARDS.
Drills or Machines for Setting Corn and Seeds.
No. 151,577. Patented June 2, 1874.
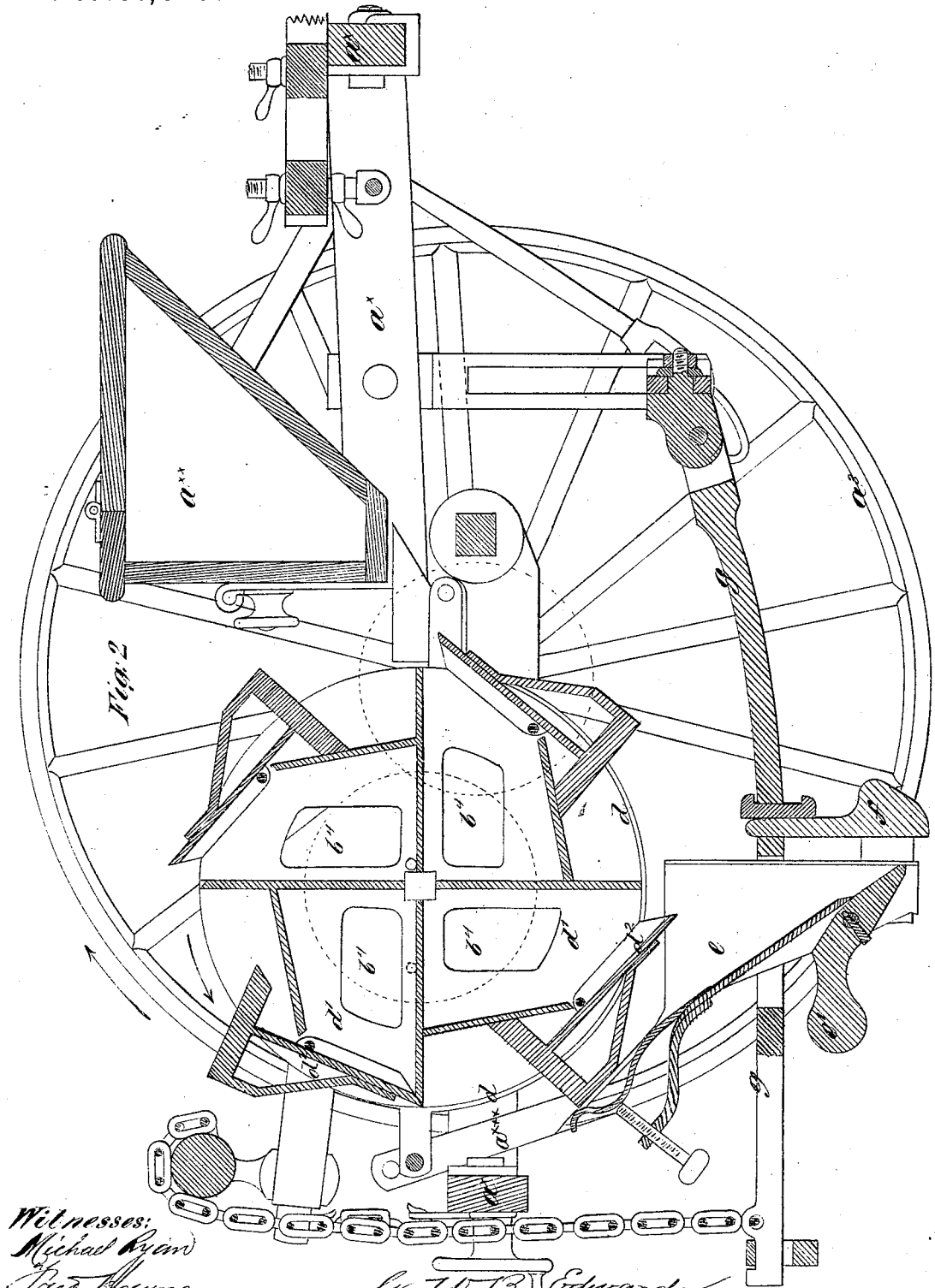

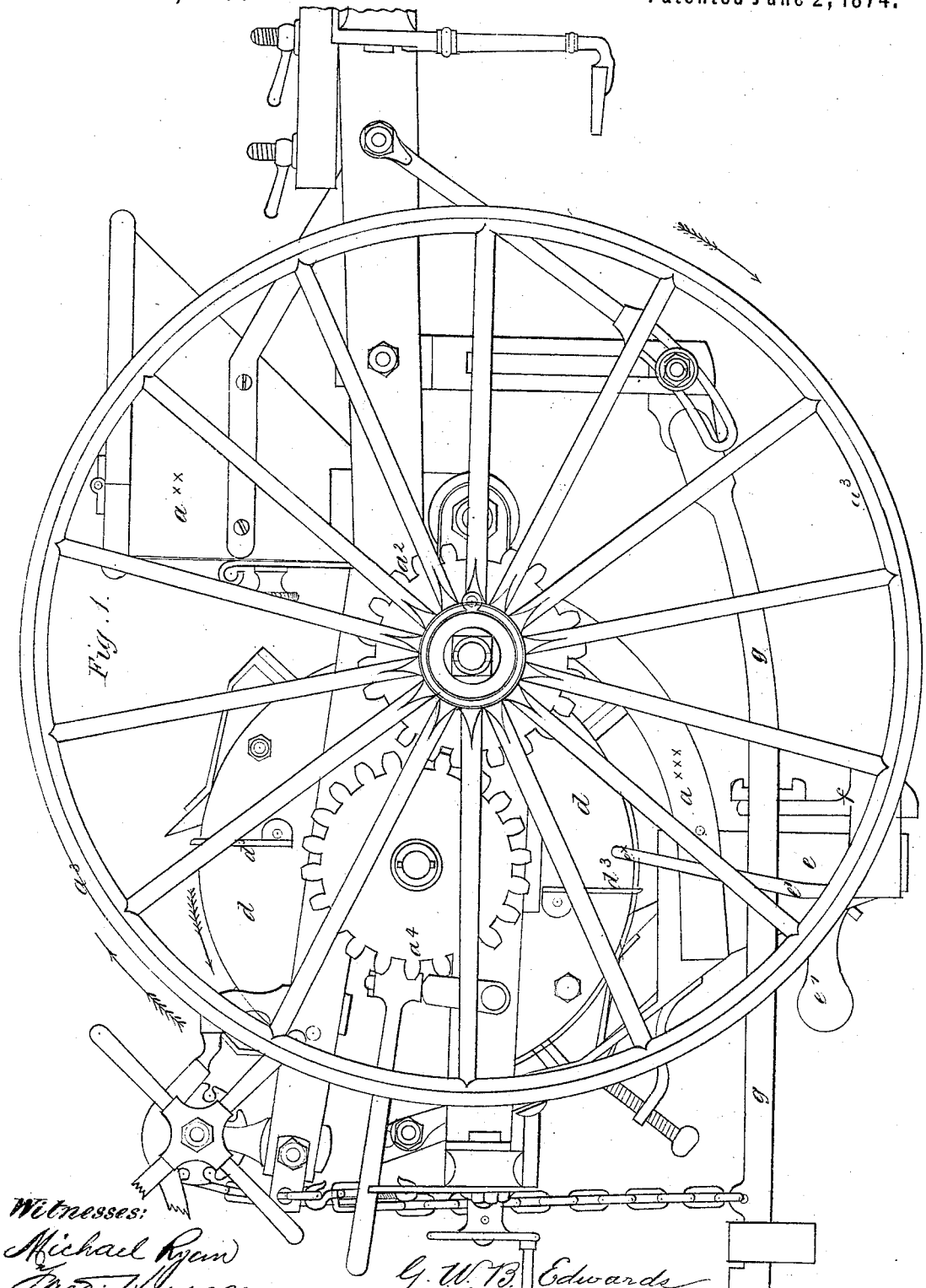

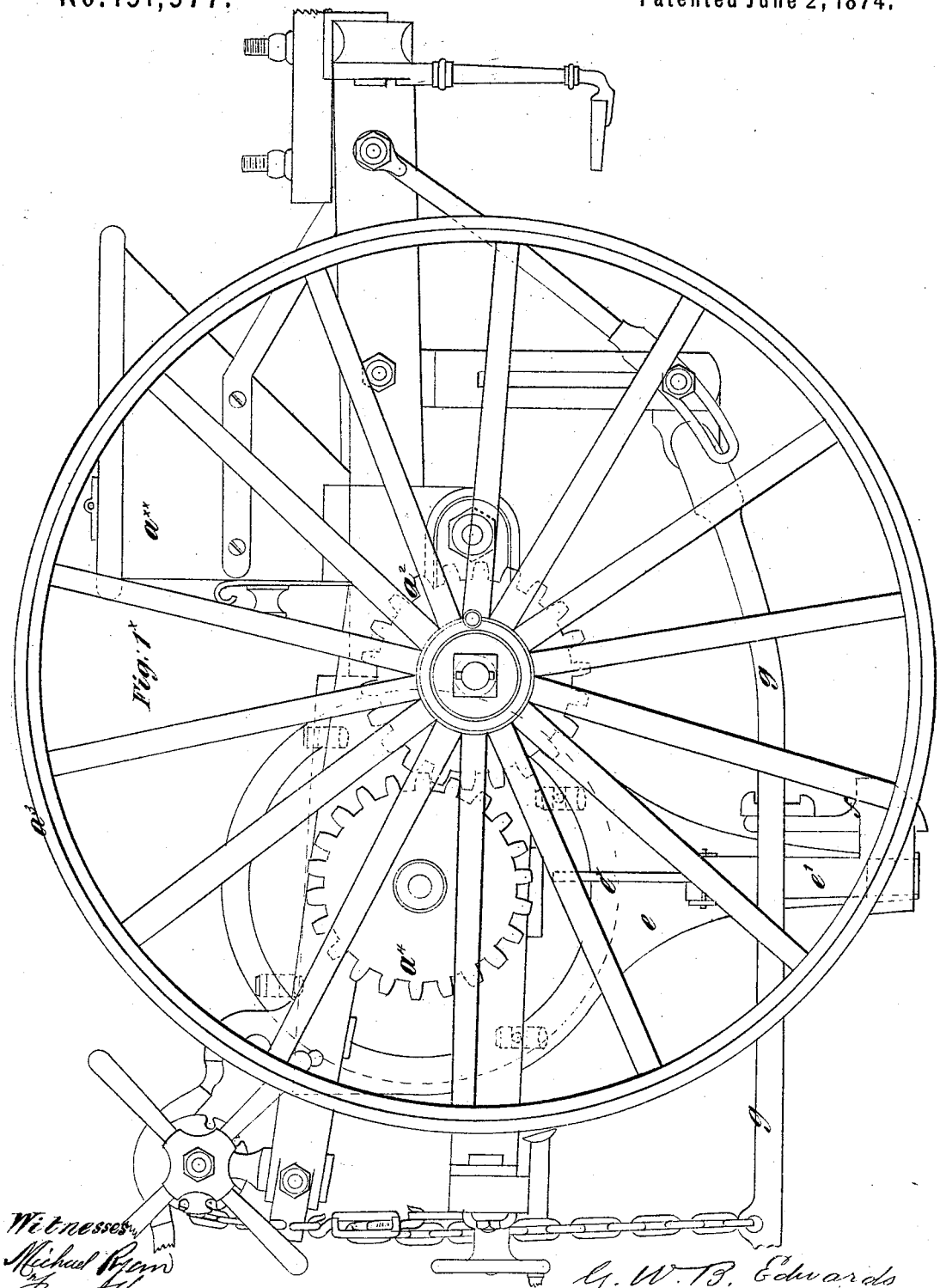

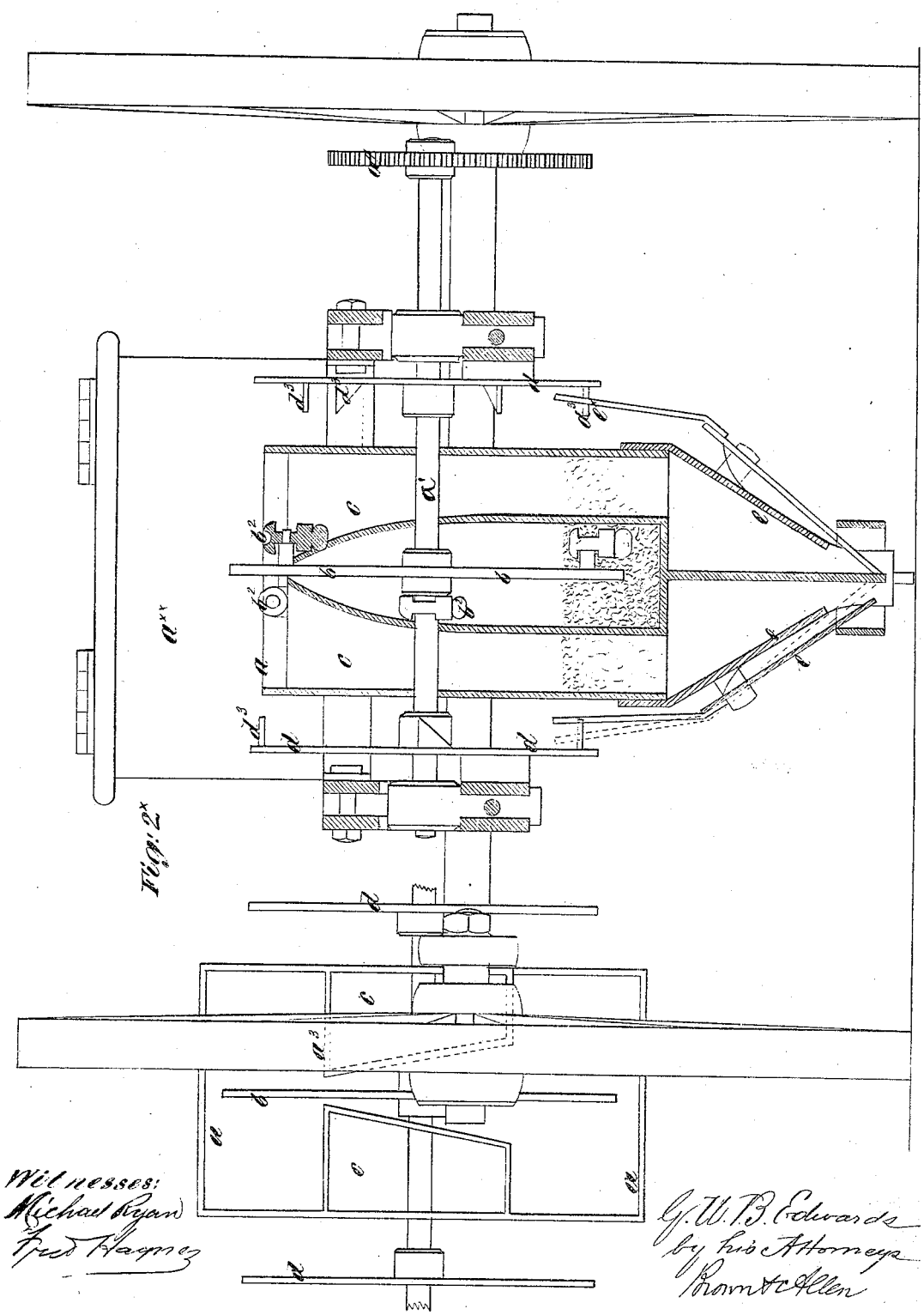

G. W. B. EDWARDS.
Drills or Machines for Setting Corn and Seeds.
No. 151,577.   Patented June 2, 1874.
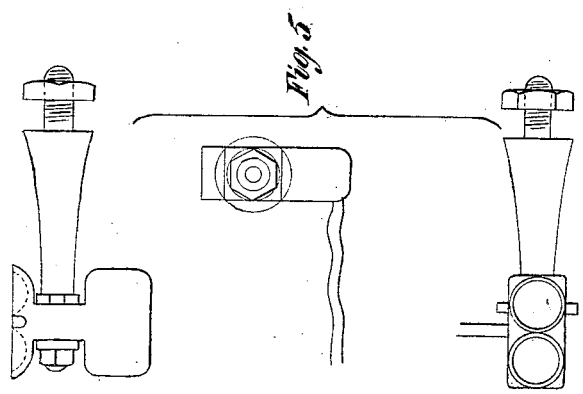
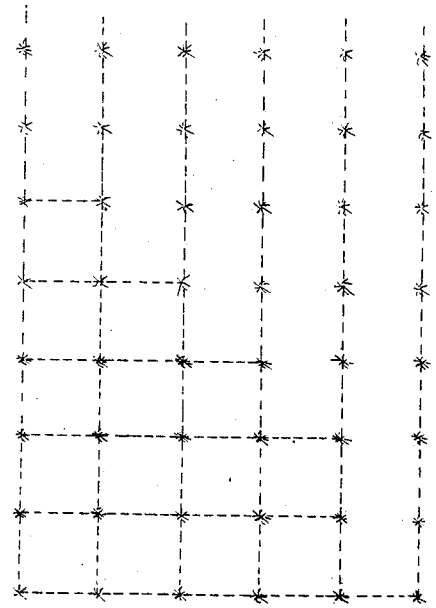
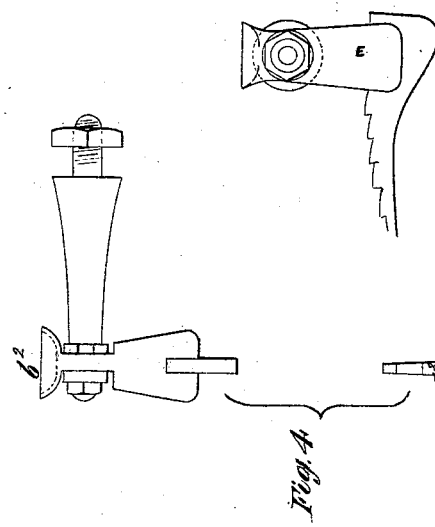
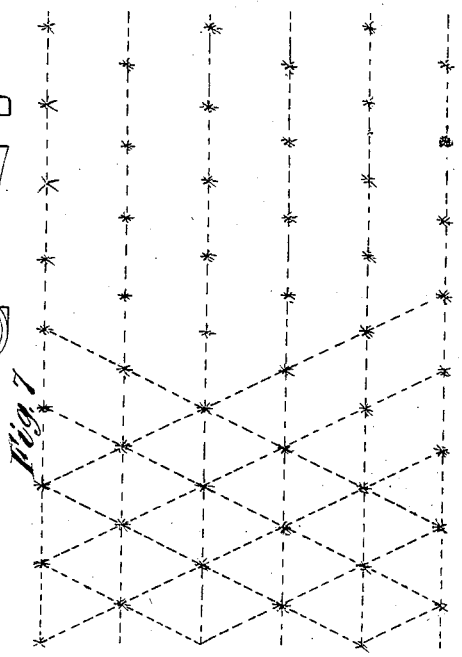
Witnesses,
Michael Ryan
Fred. Haynes
G. W. B. Edwards
by his Attorneys
Brown & Allen
6 Sheets--Sheet 5.

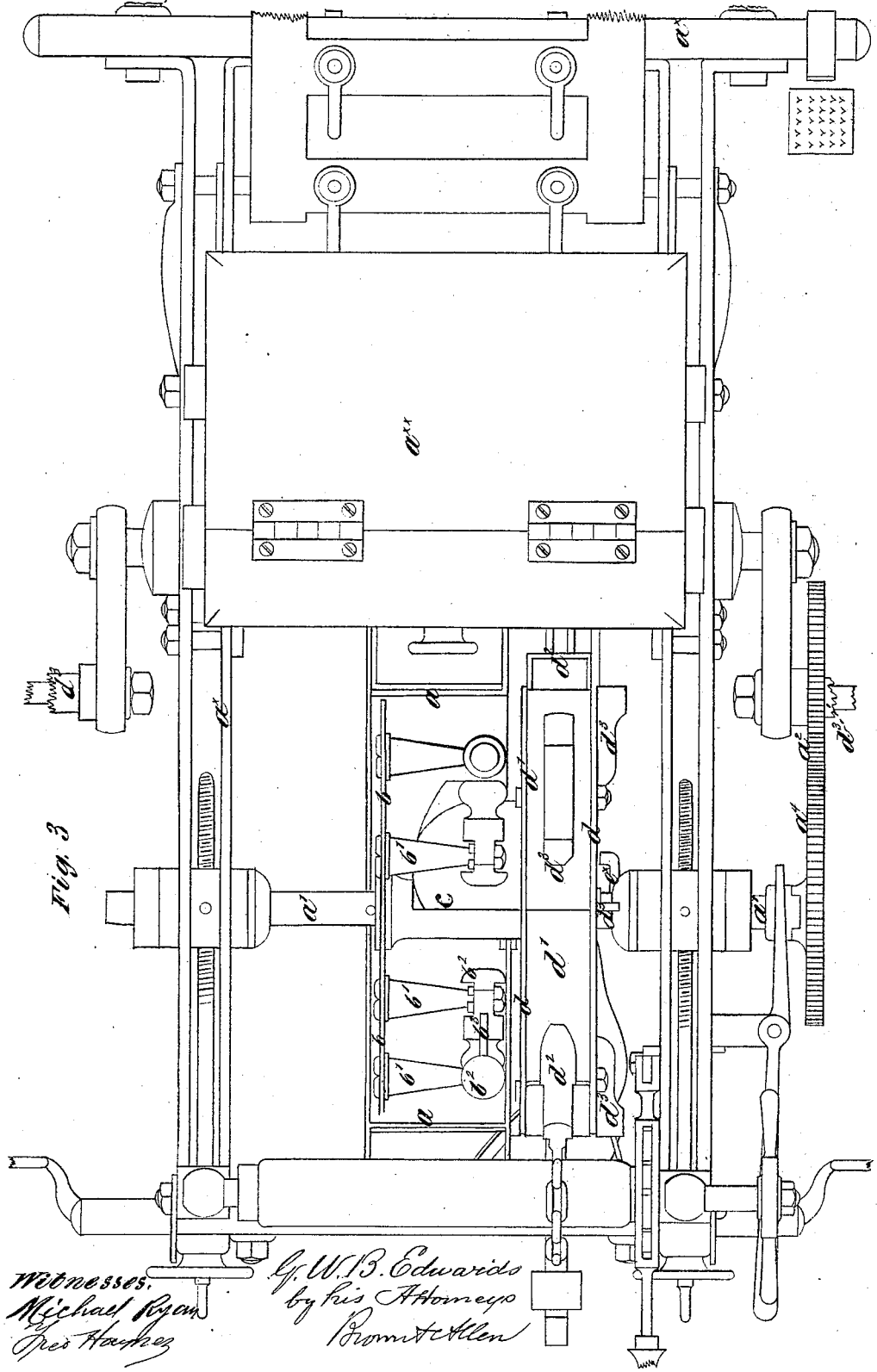

UNITED STATES PATENT OFFICE.

GRAHAM W. B. EDWARDS, OF BREDFIELD, ENGLAND.

IMPROVEMENT IN DRILLS OR MACHINES FOR SETTING CORN AND SEEDS.

Specification forming part of Letters Patent No. 151,577, dated June 2, 1874; application filed January 10, 1874.

*To all whom it may concern:*

Be it known that I, GRAHAM WILLIAM BETHAM EDWARDS, of Bredfield, in the county of Suffolk, England, land-owner, have invented certain Improvements in Drills or Machines for Setting Corn and Seeds, of which the following is a specification:

This invention relates to improved arrangements of agricultural drills or machines for setting corn and seeds, whereby each successive seed, or several seeds together, is deposited in a groove or track made by a colter or otherwise, at such regulated and uniform distances apart as may be desired. And in order that my invention may be clearly understood and readily carried into practice, I will proceed to describe the drawings hereunto annexed.

Figure 1 shows a side elevation of a drill or machine for setting corn or seeds arranged and constructed in accordance with my invention. Fig. 2 shows a vertical section taken through the revolving seed-chamber; and Fig. 3, a plan of a seed-box and revolving seed-chamber, any suitable number being mounted on the same axis.

According to my improvements, I mount and support a number of seed-boxes, $a$, upon an axis, $a^1$, and frame $a^\times$, at suitable distances apart, such seed-boxes being capable of adjustment thereon, similar to an ordinary drill. The seed is fed or supplied to the seed-boxes $a$ from the hopper $a^{\times\times}$ by a spout, as shown. Motion is given to the axis $a^1$ by a toothed-wheel, $a^2$, mounted upon and actuated by the axis $d^3$ of the traveling wheels $a^3$ of the machine. The toothed wheel $a^2$ engages with and drives a toothed wheel, $a^4$, fixed on the axis $a^1$, which thus gives motion to the revolving seed-cups $b^2$ and chambers or hoppers $d^1$. Separate views of the seed-cups $b^2$ are shown at Fig. 4. Within each seed-box a disk, $b$, is arranged, by preference formed in two parts, with a collar, so as to be readily fixed to the axis $a^1$, and exchanged when required for different kinds of seeds. At or near the periphery of the seed-cup disk $b$, on one or both sides thereof, a series of studs or arms, $b^1$, are fixed at right angles thereto, upon which the seed-cups $b^2$ are mounted, or suspended upon a pin-joint, so as to swing freely thereon with the cup end uppermost. Each seed-cup $b^2$ is furnished with a tail-piece, $b^3$, which, as the cup with the seed therein rises to its highest position, comes in contact with the lip or edge of the fixed hopper or chute $c$, fixed on the seed-box $a$, causing the cup to tip over and discharge the seeds or seed into it. From this hopper, chute, or spout $c$ the seed is conducted direct into one of a series of revolving chambers or hoppers, $d^1$, which are conveniently formed by means of two disks, $d$, connected together at about an inch apart, and partitioned off equally into four or other suitable number of radial divisions, corresponding with the number of seed-cups employed, as clearly shown in Fig. 2 of the drawings. The revolving seed-chambers $d^1$ are mounted upon and revolve with the axis $a^1$ and seed-cup disks $b$, close to the seed-box $a$, an aperture, $b^4$, being formed on the side of the seed-box into each successive chamber, through which the seed passes. From the fixed hopper, tunnel, or spout $c$ the seed is delivered into each successive chamber $d^1$ as it revolves past it. As the seed-disk $b$ and radial chambers $d^1$ rotate in unison, each seed-cup $b^2$ delivers its seed, so as to fall first into the fixed tunnel or spout $c$, and from thence into and through the side aperture $b^4$ in the revolving chambers or hoppers $d^1$. The seed thus delivered into one of the revolving chambers $d^1$ in its revolution descends to the periphery, where it is retained for a time within the chamber by means of the counterbalance lid or cover $d^2$, until it arrives over the colter, boot, chute, or spout $e$, into which it falls. The lower part or base of the boot or spout $e$, supported by the arms $a^{\times\times\times}$ upon the frame $a^\times$, is closed by a weighted lever, $e'$, jointed to the boot or trap $e$, to retain the seed until it is released by one of a series of pins or studs, $d^3$, fixed upon the revolving chambers $d^1$, which acts upon the arm $e^\times$ of the weighted lever $e'$, so as to open the bottom of the trap or chute $e$, and thus allow the seed to fall into the groove or furrow made in the ground by the colter $f$ as it advances in front of the seed spout or boot $e$, the trap-lever closing again by the action of the weighted end of the lever $e'$, ready to receive the next seed. The colter $f$ may be block, lever, or spring; but, according to one part of my improvements, I mount it, in combination with the seed boot or spout $e$, in a slotted lever-frame, $g$, as shown in the drawings, so as to be capable of adjustment to raise and lower or change it, as required.

Fig. $1^{\times}$ shows a side elevation, and Fig. $2^{\times}$ transverse section, of a drill or machine for setting corn or seeds, similar in principle to that previously described, in which the revolving chambers or receptacles $d$ $d^1$ are dispensed with, the corn or seed, as it is raised by the revolving seed-cups $b^2$, being delivered direct into the fixed hoppers or chutes $c\ c$, arranged within the seed-box $a$, as clearly shown in the drawings, similar letters of reference being placed on those parts which correspond with those in the arrangement previously described.

In the arrangement shown in Figs. $1^{\times}$ and $2^{\times}$, the seed-cups $b^2$ are mounted at alternate distances apart on each side of the disk $b$, rotating within the seed-box $a$; and as each seed-cup containing a seed or seeds arrives near its highest position, it is caused to tip over, as previously described, and discharge the seed into one or the other of the hoppers or chutes $c$, down which it falls direct into the boot, chute, or spout $e$, where it is retained for a time by the trap-lever $e'$, until released by the action of one of the series of pins, studs, or projections $d^3$, carried by the revolving disks $d$, so as to fall into the groove or furrow made to receive it by the colter $f$, as previously described, and clearly shown in the drawing hereunto annexed.

According to another part of my improvements, the seed-cups $b^2$ are formed, for some kinds of seed, with two compartments, as shown by separate views thereof at Fig. 5, so as to pick up and raise separate seed in each compartment.

Drills or machines constructed and acting in accordance with my improvements will set or plant beans, wheat, pease, or any other similar grain, either singly, or two or more together, in drills or furrows of any width, and at any desired distance from seed to seed, as shown by the diagrams, Figs. 7 and 8, of the drawings. Root seeds may also be set therewith, (one or more together, as desired,) thereby saving the cost of "chopping out."

It will be seen by the diagrams, Figs. 7 and 8, that the seeds being set laterally even, or in line, affords greater facility for cleaning the crop than when set by ordinary drills. A great saving per acre in seed-corn is effected by my improvements, combined with perfect and regular planting. The machine may be enlarged so as to plant the largest known seeds, (horticultural or otherwise,) and, if required, the machine may be reduced in size to be worked by hand labor, to suit nurserymen and seedsmen, to plant onion-seed, for instance, or the like, in drills three or four inches in width and three or four inches from seeds to seeds.

Having thus described the nature of my invention, and the manner of carrying the same into practice, I would have it understood that I do not confine myself to the exact details herein described, so long as the novel features of my invention be retained; but

What I claim is—

1. The seed-box $a$, having the fixed hopper $c$, and revolving disk $b$, having lateral arms $b^1$, carrying the swinging seed-cups $b^2$, all being combined and operated substantially as described, for the object specified.

2. The seed-box $a$ on the axis $a^1$, having the revolving disk $b$, carrying the swinging seed-cups $b^2$, and fixed spout $c$, for delivering the seed to the revolving hopper $d^1$, which conducts the seed to the seed-boot $e$, all being combined and operated substantially as described.

3. In combination with the seed-box $a$, fixed hopper $c$, and axis $a^1$, the swinging seed-cups arranged on the arms $b^1$ of the disk $b$, and having the tail-pieces $b^3$ for tilting the cups, substantially as described, for the object specified.

4. In combination with the seed-box $a$, having openings $b^4$, the disks $d$, connected together by partitions to form the radial divisions, and provided with the counterbalance-covers $d^2$, for retaining the seed in the hopper until it arrives over the spout $e$, substantially as described.

5. The swinging seed-cups on the revolving disk $b$, having two compartments for picking up two different kinds of seeds, as shown in Fig. 5.

6. The revolving chambers $d^1$, provided with the pins or studs $d^3$, in combination with the weighted lever $e'$, pivoted to the spout $c$, and the arm $e$, whereby the mouth of said spout is opened and closed automatically, as set forth.

GRAHAM W. B. EDWARDS.

Witnesses:
   JNO. MILLS,
      *Clerk to Mr. A. A. Watts,*
       *Solicitor and Notary Public,*
        *Ipswich.*
   CHS. TRICKER,
      *Clerk to same.*